(12) United States Patent
Leitner

(10) Patent No.: US 6,913,287 B2
(45) Date of Patent: Jul. 5, 2005

(54) SNOWMOBILE ELEVATION MECHANISM

(76) Inventor: Kenneth Leitner, P.O. Box 2375, Atikokan, Ontario (CA), P0T1C0

(*) Notice: Subject to any disclaimer, the term of this patent is extended or adjusted under 35 U.S.C. 154(b) by 0 days.

(21) Appl. No.: 10/648,396

(22) Filed: Aug. 27, 2003

(65) Prior Publication Data

US 2005/0045396 A1 Mar. 3, 2005

(51) Int. Cl.[7] .................................................. B60S 9/04
(52) U.S. Cl. ..................... 280/763.1; 180/190; 254/418; 280/293
(58) Field of Search ............................... 180/182, 186, 180/190, 185, 9.3; 280/293, 301–303, 762, 763.1, 764.1, 900, 43.2, 43.14, 43.17, 296, 755; 254/418, 422, 424, 425

(56) References Cited

U.S. PATENT DOCUMENTS

| | | | |
|---|---|---|---|
| 1,168,955 A | * | 1/1916 | Navarrete .................... 280/302 |
| 1,204,162 A | | 11/1916 | Kirstaetter |
| 1,539,974 A | | 4/1922 | Tucker |
| 1,536,877 A | | 5/1925 | Burniston |
| 1,714,464 A | | 5/1929 | Merriman |
| 2,218,733 A | | 10/1940 | Watts |
| 2,550,239 A | | 4/1951 | Gassman |
| 2,580,829 A | | 1/1952 | Peck |
| 2,739,784 A | | 3/1956 | Thompson et al. |
| 2,891,805 A | * | 6/1959 | Birdsall .................... 280/763.1 |
| 3,345,038 A | | 10/1967 | Taylor |
| 3,565,396 A | | 2/1971 | Spear |
| 3,570,616 A | | 3/1971 | Tominaga |
| 3,741,524 A | | 6/1973 | Morgan et al. |
| 3,785,541 A | | 1/1974 | Sibley |
| 3,806,093 A | | 4/1974 | Itazu |
| 3,826,470 A | | 7/1974 | Spear |
| 3,964,729 A | | 6/1976 | Harlow |
| 3,981,372 A | | 9/1976 | Moreau |
| 3,989,277 A | * | 11/1976 | Stahl ....................... 280/764.1 |
| 4,055,329 A | | 10/1977 | Hammond |
| 4,148,461 A | * | 4/1979 | Orth ........................... 254/425 |
| 4,643,396 A | | 2/1987 | Beals |
| 5,135,200 A | | 8/1992 | Neibrandt |
| 5,143,352 A | | 9/1992 | Latimer |
| 5,215,287 A | | 6/1993 | Leski |
| 5,421,611 A | * | 6/1995 | Peterson et al. ......... 280/763.1 |
| 5,618,030 A | | 4/1997 | Eggert |
| 5,806,836 A | | 9/1998 | Wilson |
| 5,806,837 A | | 9/1998 | Cargill et al. |
| 5,873,552 A | | 2/1999 | Skarp |
| 6,102,438 A | * | 8/2000 | Few et al. ............... 280/763.1 |
| 6,302,378 B1 | | 10/2001 | Koch et al. |
| 6,375,161 B2 | | 4/2002 | Garceau |
| 6,527,251 B1 | | 3/2003 | Garceau |
| 6,688,581 B2 | * | 2/2004 | Leitner ....................... 254/131 |
| 2004/0000778 A1 | * | 1/2004 | Ouellette ................. 280/763.1 |

FOREIGN PATENT DOCUMENTS

| | | | |
|---|---|---|---|
| CA | 2060046 | | 8/1993 |
| CA | 2123868 | | 11/1995 |
| CA | 2203493 | | 10/1998 |
| DE | 3626989 | * | 2/1988 |
| WO | 0522197 | * | 1/1993 |

* cited by examiner

Primary Examiner—Anne Marie Boehler
(74) Attorney, Agent, or Firm—Stites & Harbison PLLC; Ross F. Hunt, Jr.

(57) ABSTRACT

An elevation mechanism is disclosed for lifting the rear end of a snowmobile, the elevation mechanism comprising: a stabilizer brace pivotally mounted on the snowmobile at a point spaced forwardly of the rear end of the snowmobile for pivotal movement between transport and use positions; a ground-engaging edge on the stabilizer brace; and an extensible lifting mechanism for connecting at an upper end to the rear end of the snowmobile and connected at a lower end to the stabilizer brace for selective movement between an extended position and a compressed position; the parts being arranged such that in the use position the extensible lifting mechanism is in the extended position and the ground-engaging edge thereby engages the ground surface, while in the transport position the extensible lifting mechanism is in the compressed position and the ground-engaging edge thereby clears the ground surface.

2 Claims, 3 Drawing Sheets

SNOWMOBILE ELEVATION MECHANISM

FIELD OF THE INVENTION

The present invention relates to snowmobile elevation mechanisms, and more particularly to an elevation mechanism for attachment to a snowmobile.

BACKGROUND OF THE INVENTION

A common problem encountered by operators of drive-track type snowmobiles is the freezing of the drive track to the slide rails which can occur due to parking the vehicle for a period of time after usage. Snow and ice that have attached to the snowmobile during the riding period may melt due to temperature conditions, and refreezing of the melted snow and ice can occur given appropriate conditions, resulting in the drive track becoming frozen to the slide rails. Another problem facing snowmobile operators is the recommendation of manufacturers that their vehicles be raised above the ground surface to warn up the drive train prior to initial attempts to move the vehicle; this relates to the need to prevent drive belt wear and disintegration.

Both of these problems facing snowmobile operators can be addressed by employing means of raising the drive track above the ground surface for a desired period. However, potential solutions to these problems are complicated by the weight of commercially available snowmobiles, which can be as much as 700 pounds. Lifting a vehicle of such considerable size is a difficult task. It is also extremely dangerous, as the vehicle must be held up with one hand while a support is positioned beneath the vehicle with the other hand.

It is not uncommon to see snowmobiles propped up on wood crates or the like as supports that are perceived as adequate for elevating the vehicle drive track. However, there are serious safety concerns with such a practice, as the operator must engage in strenuous and potentially harmful manual lifting of the vehicle rear to rest it upon the crate, and the crate is likely not a thoroughly stable support apparatus in any event. Lack of a stable support could result in the vehicle falling from the elevated position, potentially causing damage to the vehicle and its surroundings and injury to bystanders. In addition, using such a method when warming up the vehicle prior to operation could result in further potential damage from the vehicle surging forward upon support collapse.

Prior attempts to address these problems include a variety of devices such as stands and jacks. Many of these devices are separate from the vehicle, however, and may not be available when needed due to susceptibility to loss or lack of storage space on the vehicle There are a handful of devices that are capable of attachment to the snowmobile itself, such as U.S. Pat. No. 3,981,372 to Moreau and U.S. Pat. No. 3,785,541 to Sibley. However, most of these devices fail to provide the vehicle operator with relief from the physical stresses involved in lifting or rocking their vehicles into the raised position.

In addition, another concern remains in that the snowmobile is susceptible to tipping once it is moved into the lifted position, as many of the lifting mechanisms become highly unstable once extended. When a snowmobile is raised off of the ground at the rear and is supported only by the lifting mechanism and front skis, the stability of the vehicle is jeopardized. As the skis can readily pivot, the snowmobile is balanced precariously on these skis and the extended, unstable lifting mechanism. In such a situation, the snowmobile may topple to one side or the other, a problem exacerbated by the fact that the skis are designed to slide in the underlying snow and may assist in the toppling by allowing the weight of the snowmobile to shift forward or backward.

While lifting mechanisms for vehicles such as four-wheeled automobiles can allow for a certain degree of instability due to the over-all stability of the automobile itself, snowmobiles are designed in such a way that this instability is a significant problem, and toppling of the snowmobile due to unstable lifting mechanisms can lead to vehicle damage or operator injury.

SUMMARY OF THE INVENTION

In response to these problems, the present invention seeks to provide means for safely elevating a snowmobile into a stable position, preventing refreezing of the drive track to the slide rails and allowing for elevated drive train warm-up. The present invention also seeks to provide a snowmobile stand mechanism that can be attached to a snowmobile even during transport, said mechanism requiring limited physical exertion for operation.

According to a first aspect of the present invention there is provided an elevation mechanism for a snowmobile of the type having a drive track at a rear end of the snowmobile for driving the snowmobile over a ground surface, the elevation mechanism having a transport position spaced above the ground surface and a use position supporting the rear end of the snowmobile with the drive track spaced above the ground surface, the elevation mechanism comprising:

a stabilizer brace;

a stabilizer brace mount for pivotally mounting the stabilizer brace on the snowmobile at a point spaced forwardly of the rear end of the snowmobile for pivotal movement between the transport and use positions;

a ground-engaging edge on the stabilizer brace spaced from the stabilizer brace mount; and an extensible lifting mechanism for connecting at an upper end to the rear end of the snowmobile and connected at a lower end to the stabilizer brace for selective movement between an extended position and a compressed position;

the parts being arranged such that in the use position the extensible lifting mechanism is in the extended position and the ground-engaging edge thereby engages the ground surface, while in the transport position the extensible lifting mechanism is in the compressed position and the ground-engaging edge thereby clears the ground surface.

According to a second aspect of the present invention there is provided, in a snowmobile of the type having a drive track at a rear end of the snowmobile for driving the snowmobile over a ground surface, an elevation mechanism for selectively supporting the drive track above the ground surface, the elevation mechanism comprising:

a stabilizer brace;

a stabilizer brace mount pivotally mounting the stabilizer brace on the snowmobile at a point spaced forwardly of the rear end of the snowmobile for pivotal movement between the transport and use positions;

a ground-engaging edge on the stabilizer brace spaced from the stabilizer brace mount; and an extensible lifting mechanism connected at an upper end to the rear end of the snowmobile and at a lower end to the stabilizer brace for selective movement between an extended position and a compressed position;

the parts being arranged such that in the use position the extensible lifting mechanism is in the extended position and the ground-engaging edge thereby engages the ground surface, while in the transport position the extensible lifting mechanism is in the compressed position and the ground-engaging edge thereby clears the ground surface.

In preferred embodiments of the present invention, the stabilizer brace comprises a substantially straight base member and two substantially parallel members connected to each other at a rearward end by the base member, the ground-engaging edge on the base member, and two stabilizer brace mounts for pivotally mounting forward ends of the parallel members on opposite sides of the snowmobile. The extensible lifting mechanism is preferably a scissors jack, due to strength and ease of use, and a manually operable variant of this is illustrated in the exemplary embodiment following. It is to be understood, however, that other types of lifting or jack mechanisms may be employed, for example the lifting mechanism could comprise two collapsible linkages powered by hydraulic or pneumatic means communicating with the connection between the linkages, with one of the linkages connected to the side of the snowmobile and the other connected to the stabilizer brace.

Most stand or jack mechanisms currently on the market are cumbersome and of complex, expensive construction, but the present invention provides for a very simple, lightweight mechanism. Also, most commercially available mechanisms are incapable of being used with such beneficial devices as scissors jacks, they often attach at the rear end of the snowmobile which thereby increases the instability, and they are usually limited to one predetermined elevation height as built into the mechanism design. The present invention, on the other hand, takes full advantage of the strength and ease of use of devices such as scissors jacks, the attachment point for the stabilizer brace is forward on the vehicle to improve stability, and the use of adjustable-height jacks such as scissors jacks allows for variable height elevation. Where commercially available scissors jacks are employed by themselves apart from the present invention, the loss of stability as the jack is extended is undesirable, but the present invention addresses this problem and adds stability to the strength and ease of use of the jack.

A detailed description of an exemplary embodiment of the present invention is given in the following. It is to be understood, however, that the invention is not to be construed as limited to this embodiment.

BRIEF DESCRIPTION OF THE DRAWINGS

In the accompanying drawings, which illustrate an exemplary embodiment of the present invention.

DETAILED DESCRIPTION OF AN EXEMPLARY EMBODIMENT

Figure 1:
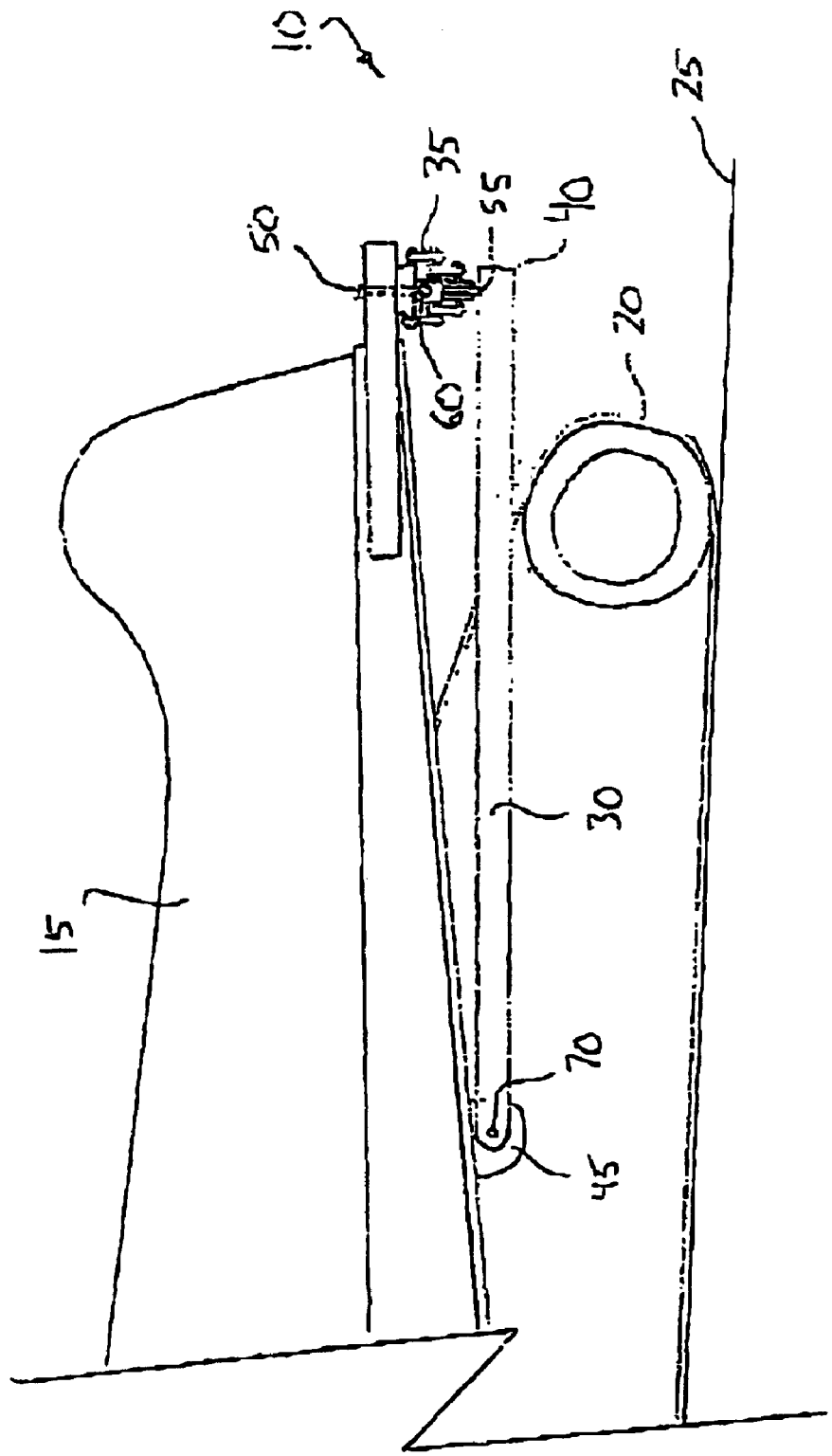
FIG. 1 is a side elevation view of the present invention, with the elevation mechanism in the transport position.

Referring now in detail to the accompanying drawings, there is illustrated an exemplary embodiment of the snowmobile elevation mechanism of the present invention generally referred to by the numeral 10, shown removably attached to a snowmobile 15, said snowmobile 15 of a common type familiar to those skilled in the art and requiring no further description. The snowmobile 15 is driven by a drive track 20 for driving the snowmobile 15 over the ground surface 25. As can best be seen in FIGS. 1 and 2, the elevation mechanism 10 comprises a stabilizer brace 30, a stabilizer brace mount 45 (one on either side of the snowmobile 15, as can best be seen in FIG. 3) pivotally mounting the stabilizer brace 30 at a pivot point 70, and an extensible lifting mechanism. The stabilizer brace 30 has a ground-engaging edge 40 which engages the ground surface 25 when the elevation mechanism 10 is in the use position as in FIG. 2. The extensible lifting mechanism is a scissors jack 35 in the exemplary embodiment, but other lifting mechanisms may be employed.

Figure 3:
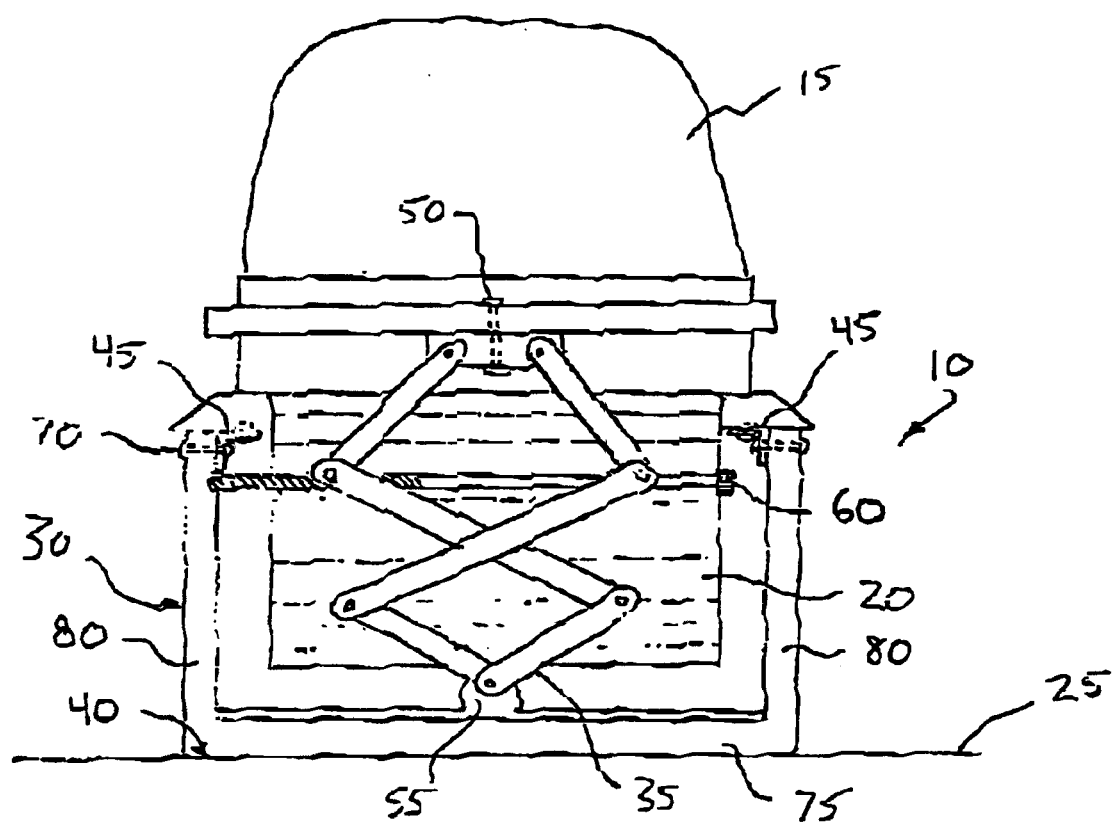
FIG. 3 is a rear elevation view of the present invention, with the elevation mechanism in the use position.

As can be seen in FIG. 3, the stabilizer brace 30 comprises a base member 75 connecting two substantially parallel members 80. This configuration provides enhanced stability due to the full length of the base member being substantially in contact with the ground surface 25, but it need not be in contact along its entire length with the ground surface 25 in order to provide desirable stability. The stabilizer brace 30 is attached to the snowmobile 15 at the pivot points 70 by suitable means familiar to those skilled in the art.

The scissors jack 35 is connected to the snowmobile 15 by mounting means 50, and to the base member 75 by mounting means 55. The mounting means 50, 55 may be any of various mechanisms well known to those skilled in the art. The scissors jack 35 is extended or compressed by means of the actuating member 60, which in the exemplary embodiment is a simple threaded rod that is turned to drive extension or compression of the scissors jack 35 in a manner known in the art.

Figure 2:
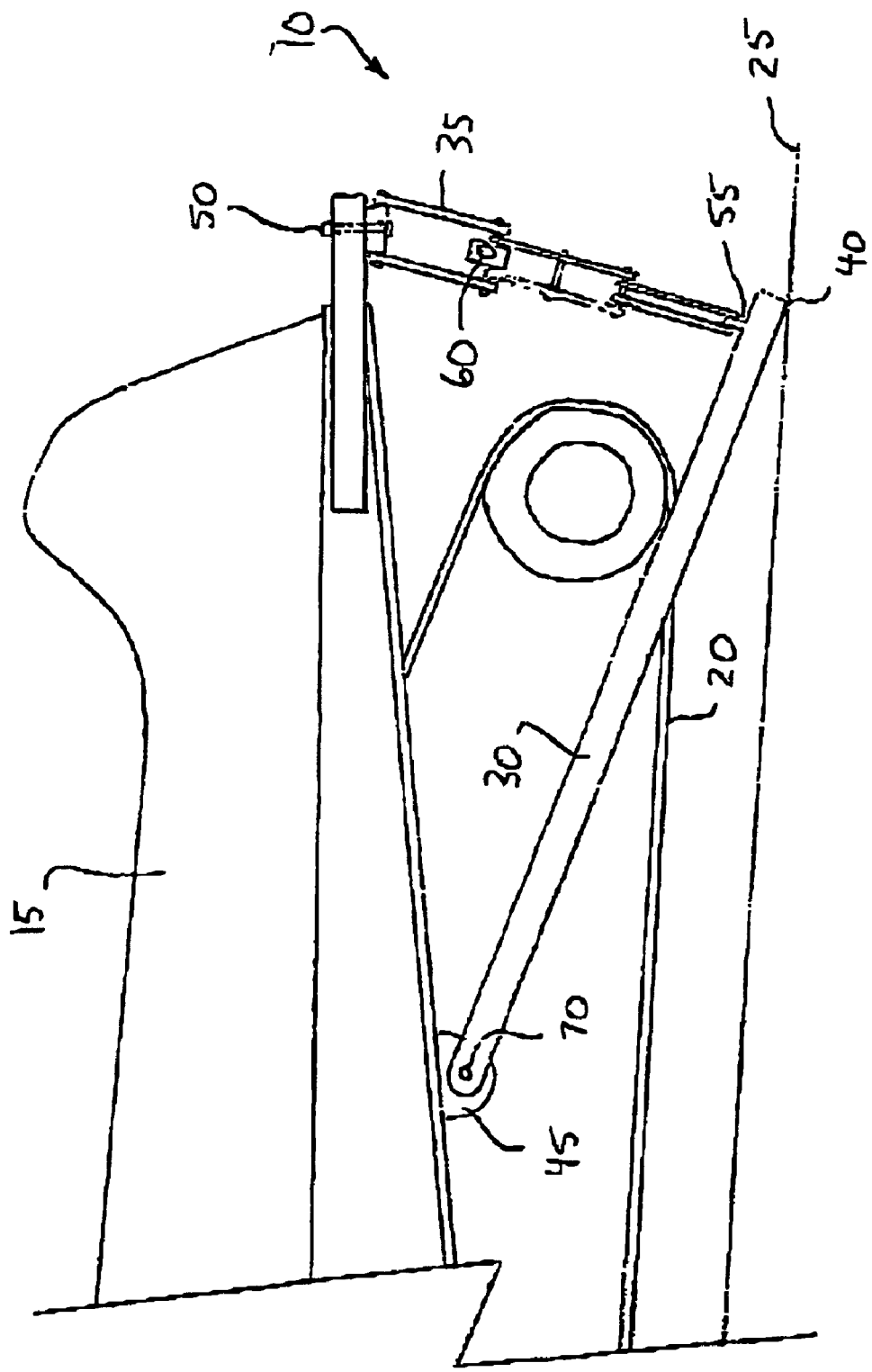
FIG. 2 is a side elevation view of the present invention, with the elevation mechanism in the use position.

Having fitted a snowmobile 15 with the snowmobile elevation mechanism 10 described above, the utility of the present invention becomes clear in the following situation. Having either operated the snowmobile 15 and being desirous of parking it for a period of time, or being desirous of starting the snowmobile 15 with an elevated position to allow proper warm-up, the snowmobile stand mechanism 10 is operated as follows. The snowmobile elevation mechanism 10 is initially in the transport position as illustrated in FIG. 1 The operator (not shown) then turns the actuating member 60 in a first direction to cause the scissors jack 35 to extend. This eventually causes the ground-engaging edge 40 of the stabilizer brace 30 to engage the ground surface 25, and the force directed into the base member 75 by the scissors jack 35 will force the drive track 20 of the snowmobile 15 clear of the ground surface 25. The stabilizer brace 30 then provides a stable support for the snowmobile 15 for the desired storage or warm-up period, as is illustrated in FIGS. 2 and 3. When the operator is desirous of operating the snowmobile 15 once more, the actuating member 60 is turned in a second direction to cause the scissors jack 35 to compress, drawing the stabilizer brace 30 upwards and away from the ground surface 25, such that the elevation mechanism 10 is now clear of the ground surface 25 and the snowmobile 15 can be operated.

While a particular embodiment of the present invention has been described in the foregoing, it is to be understood that other embodiments are possible within the scope of the invention and are intended to be included herein. It will be clear to any person skilled in the art that modifications of and adjustments to this invention, not shown, are possible without departing from the spirit of the invention as demonstrated through the exemplary embodiment. A scissors jack is only one possible extensible lifting mechanism, and many others are well known in the art, and the stabilizer brace can take many forms other than the simplified variant illustrated in the drawings. The actuating member could also take the form of a motor-driven device rather than the manually operated variant discussed herein. The invention is therefore to be considered limited solely by the scope of the appended claims.

What is claimed is:

1. An elevation mechanism for a snowmobile having a drive track at a rear end of the snowmobile for driving the snowmobile over a ground surface, the elevation mechanism having a transport position spaced above the ground surface and a use position supporting the rear end of the snowmobile with the drive track spaced above the ground surface, the elevation mechanism comprising:

a stabilizer brace comprising a ground-engaging base member and two spaced apart arms secured to and projecting from the base member;

a stabilizer brace mount for pivotally mounting the stabilizer brace arms on opposite sides of the snowmobile at a bracing mounting point spaced from the base member and spaced forwardly of the rear end of the snowmobile for pivotal movement of the brace between a transport condition extending rearwardly from the stabilizer brace mounting point and a use condition sloping downwardly to the rear of the snowmobile from the brace mounting point, the transport and use conditions corresponding to the transport and use positions respectively of the elevation mechanism;

an extensible lift having upper and lower ends with the lower end of the lift connected to the stabilizer brace at a lower attachment position spaced from the brace mounting position, the lift being selectively actuable between extended use and retracted transport conditions corresponding to the transport and use positions respectively of the elevation mechanism; and a lift mount for mounting the upper end of the lift on the rear end of the snowmobile at an upper attachment position rearwardly from the brace mounting position and rearwardly of the drive track;

whereby:

the lift is positioned rearwardly from the drive track;

in the use position of the elevation mechanism, the extensible lift is in the extended condition and the base member of the stabilizing brace engages the ground surface; and while in the transport position of the elevation mechanism, the extensible lift is in the retracted condition and the base member clears the ground surface; and wherein the extensible lift is a scissors jack.

2. In a snowmobile having a drive track at a rear end of the snowmobile for driving the snowmobile over a ground surface, an elevation mechanism for selectively supporting the drive track above the ground surface, the elevation mechanism comprising:

a stabilizer brace comprising a base member and two spaced apart arms secured to and projecting from the base member;

a stabilizer brace mount pivotally mounting the stabilizer brace arms on opposite sides of the snowmobile at a brace mounting point spaced from the base member and spaced forwardly of the rear end of the snowmobile for pivotal movement of the brace between a transport condition extending rearwardly from the stabilizer brace mounting point and a use condition sloping downwardly to the rear of the snowmobile from the brace mounting point, the transport and use conditions corresponding to the transport and use positions respectively of the elevation mechanism;

an extensible lift having upper and lower ends with the lower end of the lift connected to the stabilizer brace at a lower attachment position spaced from the brace mounting position, the lift being selectively actuable between extended use and retracted transport conditions corresponding to the transport and use positions respectively of the elevation mechanism; and a lift mount mounting the upper end of the lift on the rear end of the snowmobile at a position spaced rearwardly from the brace mounting position and rearwardly of the drive track;

whereby:

in the use position of the elevation mechanism, the extensible lift is in the extended condition and the base member of the stabilizing brace engages the ground surface; and while in the transport position of the elevation mechanism, the extensible lift is in the retracted condition and the base member clears the ground surface; and wherein the extensible lift is a scissors jack.

* * * * *